(12) United States Patent
Mikhail

(10) Patent No.: US 7,536,865 B2
(45) Date of Patent: May 26, 2009

(54) METHOD AND SYSTEM FOR BALANCING BLEED FLOWS FROM GAS TURBINE ENGINES

(75) Inventor: Sami H. Mikhail, Toronto (CA)

(73) Assignee: Honeywell International Inc., Morristown, NJ (US)

(*) Notice: Subject to any disclaimer, the term of this patent is extended or adjusted under 35 U.S.C. 154(b) by 440 days.

(21) Appl. No.: 11/054,421

(22) Filed: Feb. 9, 2005

(65) Prior Publication Data

US 2006/0174628 A1 Aug. 10, 2006

(51) Int. Cl.
 *F02C 9/00* (2006.01)
(52) U.S. Cl. .......................................... 60/795; 60/782
(58) Field of Classification Search ............... 60/782, 60/785, 795
See application file for complete search history.

(56) References Cited

U.S. PATENT DOCUMENTS

| | | | |
|---|---|---|---|
| 2,316,237 A | 4/1943 | Grunert et al. | |
| 2,648,490 A | 8/1953 | Messinger et al. | |
| 2,973,702 A | 3/1961 | Andresen, Jr. | |
| 3,177,679 A | 4/1965 | Quick et al. | |
| 3,537,510 A | 11/1970 | Rannenberg et al. | |
| 3,559,559 A | 2/1971 | Furlong et al. | |
| 4,671,318 A | 6/1987 | Benson | |
| 4,765,131 A | 8/1988 | Benson | |
| 4,779,644 A | 10/1988 | Benson | |
| 4,815,285 A | 3/1989 | Martin | |
| 5,063,963 A | 11/1991 | Smith | |
| 5,145,124 A | 9/1992 | Brunskill et al. | |
| 5,155,991 A | 10/1992 | Bruun | |
| 5,927,257 A | 7/1999 | Hackett | |
| 5,934,614 A | 8/1999 | Mueller et al. | |
| 6,058,725 A | 5/2000 | Monfraix et al. | |
| 6,494,047 B2 | 12/2002 | Yeung | |
| 7,036,319 B2 * | 5/2006 | Saunders et al. | ............. 60/782 |
| 2002/0069646 A1 | 6/2002 | Yeung | |
| 2004/0139751 A1 | 7/2004 | Liu et al. | |

FOREIGN PATENT DOCUMENTS

| | | |
|---|---|---|
| EP | 0507725 | 10/1992 |
| EP | 1413762 | 4/2004 |

* cited by examiner

*Primary Examiner*—William H Rodríguez
(74) *Attorney, Agent, or Firm*—Oral Caglar, Esq.

(57) ABSTRACT

A bleed air balancing system includes a plurality of bleed air flow paths (12) each carrying bleed air from one of a plurality of gas turbine engines (10), each bleed air flow path (12) including a flow rate sensor (19), and a circuit (52, 200) outputting at least one flow rate setpoint based on flow rates measured by each of the flow rate sensors (19), wherein each of the plurality of bleed air flow paths (12) includes: a pressure regulating valve (16), a pressure sensor (18), and a controller (20) for controlling the position of the pressure regulating valve (16), the controller (20) including an output (26) connected to the pressure regulating valve (16), a pressure control loop (60) generating a pressure correction signal, and a flow control loop (62) generating a flow correction signal, wherein the controller (20) outputs a control signal (28) on the output (26) based on the pressure correction signal and the flow correction signal. A method of operating the system is also disclosed.

20 Claims, 8 Drawing Sheets

METHOD AND SYSTEM FOR BALANCING BLEED FLOWS FROM GAS TURBINE ENGINES

FIELD OF THE INVENTION

The present invention is directed toward a method and system for balancing bleed air flows from gas turbine engines, and, more specifically, toward a method and system for balancing bleed air flows based on pressure, flow rate and, optionally, temperature measurements in a plurality of bleed air flow paths.

BACKGROUND OF THE INVENTION

The practice of bleeding air from one or more gas turbine aircraft engines to provide pneumatic and thermal power to different aircraft systems is well known. The bleed air may be used for, for example, cabin pressurization and temperature control and other environmental control equipment. It may also be provided to thrust reversing systems, anti-icing equipment, and/or pneumatically powered equipment. Higher fuel efficiency and a reduction in engine wear are obtained by minimizing the amount of air that is bled.

Under normal operating conditions, it is desirable to distribute the burden of supplying air for these auxiliary functions among the several engines of an aircraft. Without accurate allocation of the airflow burden among the several engines, the engine having the greatest burden experiences disproportionately diminished fuel economy, elevated operating temperature, and increased wear.

Satisfactory flow balancing could be achieved if flow-control valves were provided in bleed air flow paths in addition to pressure regulating valves so that flow and pressure could each be regulated by a valve designed for one particular purpose. However, economic and weight considerations generally require that a single pressure regulation valve be used for both pressure and flow regulation.

One way of making a pressure control valve perform both functions is to superimpose a trimming signal based on flow rate information on a standard pressure regulation command which is issued to a pressure regulation valve. One disadvantage of this approach is that flow signal feedback can cause small amplitude, high frequency oscillations, or limit-cycling, of the pressure regulating valve, on the order of 0.5 to 2 Hz, for example. These oscillations may not significantly impair the function of the regulating system, but could lead to more rapid fatigue in valve linkages and accelerated wearing of the valve. Moreover, when a flow imbalance occurs, it is generally desirable to rapidly correct it; however, systems capable of such rapid corrections generally suffer from the above-mentioned limit cycling problem.

Occasionally, due to engine or cooling system malfunctions, heat exchangers that are often part of a bleed path may overheat and get damaged. Typical flow balancing systems are not designed to compensate for such damage.

It would therefore be desirable to provide a system and method for regulating pressure and flow rate in an engine bleed air system that provides accurate pressure and flow rate control and that avoids limit-cycling of the pressure regulating valves.

SUMMARY OF THE INVENTION

These problems and others are addressed by the present invention which comprises, in a first aspect, a method of balancing bleed air flows in a plurality of bleed air flow paths associated with a plurality of gas turbine engines where each bleed air flow path includes a pressure regulating valve. The method involves measuring a flow rate in each of the bleed air flow paths and determining a flow setpoint for each bleed air flow path based on the measured flow rate in the bleed air flow paths and measuring a pressure in each of the bleed air flow paths and providing a reference pressure. A position of the pressure regulating valve in each bleed air flow path is controlled based on a flow difference between the measured flow rate in each bleed air flow path and the flow setpoint and a pressure difference between the measured pressure in each bleed air flow path and the reference pressure.

Another aspect of the invention comprises a bleed air balancing system that includes a plurality of bleed air flow paths each carrying bleed air from one of a plurality of gas turbine engines, each bleed air flow path including a flow rate sensor, and a circuit outputting at least one flow rate setpoint based on flow rates measured by each of the flow rate sensors. Each of the plurality of bleed air flow paths includes: a pressure regulating valve, a pressure sensor, and a controller for controlling the position of the pressure regulating valve, the controller including an output connected to the pressure regulating valve, a pressure control loop generating a pressure correction signal, and a flow control loop generating a flow correction signal. The controller outputs a control signal on the output based on the pressure correction signal and the flow correction signal.

A further aspect of the invention comprises a method of balancing bleed air flows in a plurality of bleed air flow paths associated with a plurality of gas turbine engines where each bleed air flow path includes pressure regulating valve. The method involves measuring a flow rate in each of the bleed air flow paths, measuring a temperature in each of the bleed air flow paths and determining a flow setpoint for each of the bleed air flow paths based on the measured temperature and measured flow rate in each of the bleed air flow paths. The method further includes determining a reference pressure and, for each of the bleed air flow paths: measuring a pressure in each bleed air flow path and determining a pressure difference between the reference pressure and the measured pressure in the flow path, determining a flow difference between the flow set point for each bleed air flow path and the measured flow rate, weighting the pressure difference by a first amount, weighting the flow difference by a second amount, and controlling a position of the pressure regulating valve based on said weighted pressure difference and said weighted flow difference.

BRIEF DESCRIPTION OF THE DRAWINGS

These benefits and others will be better understood after a reading and understanding of the following detailed description of embodiments of the invention together with the following drawings wherein.

DETAILED DESCRIPTION

Figure 1:
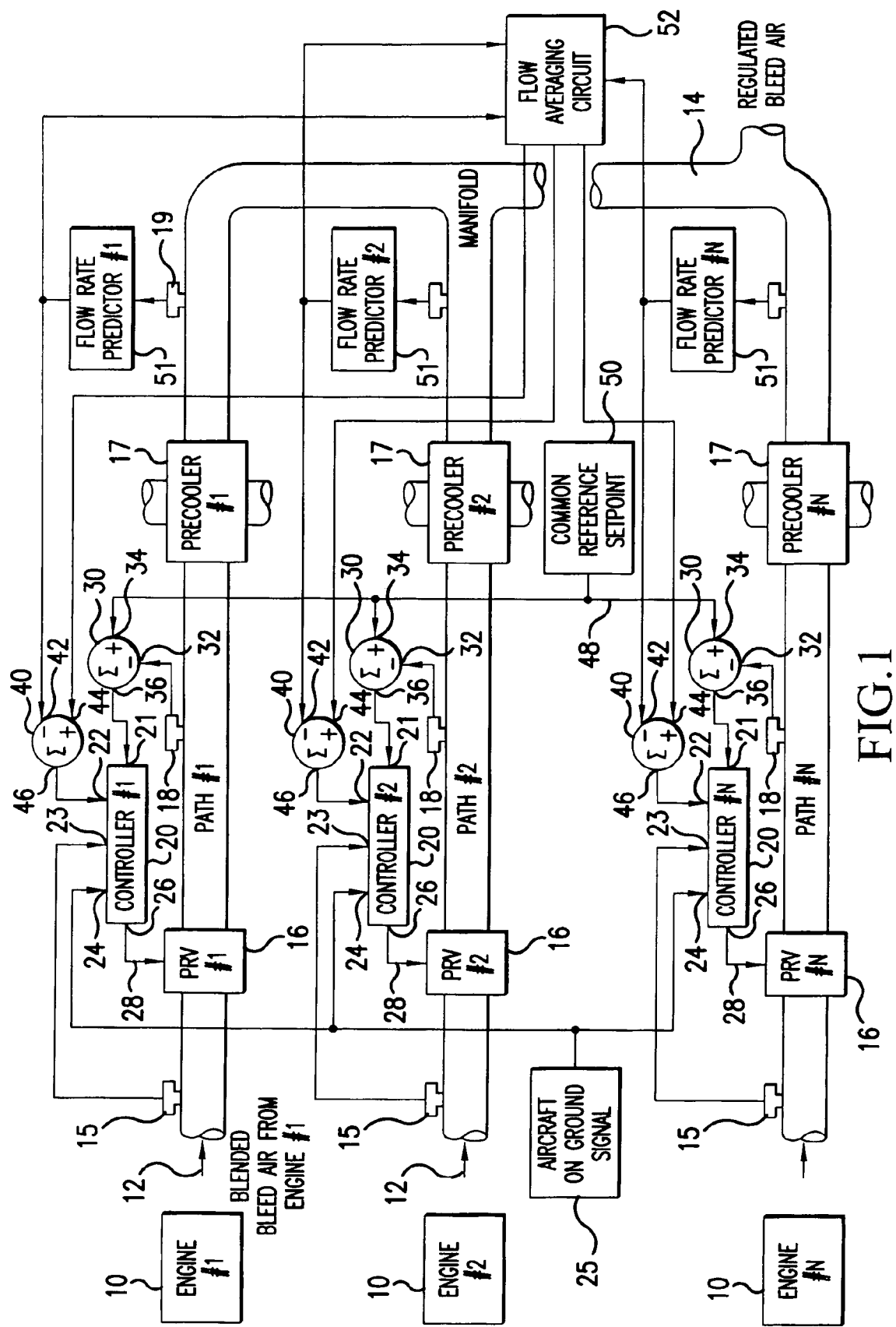
FIG. 1 schematically illustrates a bleed air balancing system, including a plurality of controllers, according to an embodiment of the present invention.

Referring now to the drawings, wherein the showings are for purposes of illustrating embodiments of the invention only and not for the purpose of limiting same, FIG. 1 schematically illustrates a flow balancing system for balancing bleed air flow drawn from a plurality of gas turbine engines 10 identified as Engine 1, Engine 2 and Engine N. While three engines 10 are illustrated, the present system can be used with any number of engines. Hot air from the high and low pressure stages of each engine compressor is blended using a system of valves (not shown) and enters a bleed air flow path or channel 12 leading from the outlet of the bleed air blending system in a downstream direction to a manifold 14. Various systems (not shown) that require bleed air to operate receive bleed air from manifold 14.

Each bleed air path 12 includes an intermediate pressure sensor 15, a pressure regulating valve (PRV) 16, a regulated pressure sensor 18 downstream of PRV 16, a precooler/heat exchanger 17, and a flow sensor 19 which may be located anywhere along the path but is often downstream of the precooler/heat exchanger 17. Each PRV 16 is operatively connected to a controller 20 which has a pressure offset input 21, a flow offset input 22 a measured intermediate-pressure input 23, an aircraft on-ground signal input 24 receiving a signal from an aircraft on ground sensor 25, and an output 26 operatively connected to PRV 16 on which an output signal 28 is sent to PRV 16 to control the position of a regulating element (not shown) in PRV 16. Details on the generation of signal 28 are provided below.

Each bleed air path 12 is associated with a pressure comparator 30 having a measured pressure input 32, a reference pressure input 34 and an output 36 connected to pressure offset input 22 of controller 20. A flow comparator 40 having a predicted flow input 42, a reference flow input 44 and an output 46 is connected to flow offset input 24 of controller 20. The pressure sensor 18 in each flow path 12 is connected to the measured pressure input 32 of the pressure comparator 30 in that path 12.

Reference pressure input 34 of pressure comparator 30 is connected to a common reference pressure line 48 which in turn is connected to a reference pressure 50. The reference pressure input 34 of each pressure comparator 30 is connected to this common line 48.

Each flow sensor 19 is connected to a flow averaging circuit 52 through a lead/lag filter 51 whose output is a predicted flow rate for that flow path. This filter compensates for a potentially slow dynamic response of the flow sensor, and its characteristics are matched to those of the particular flow sensor 26 used. Flow averaging circuit 52 receives inputs from the lead/lag filters 51 and outputs a common flow setpoint or reference flow value to reference flow input 42 of each flow rate comparator 40. The common flow setpoint is the instantaneous arithmetic average of the predicted air flow in each channel 12. The outputs of the lead/lag filters 51 are also input to measured flow inputs 44 of the flow rate comparators 40.

Figure 2:
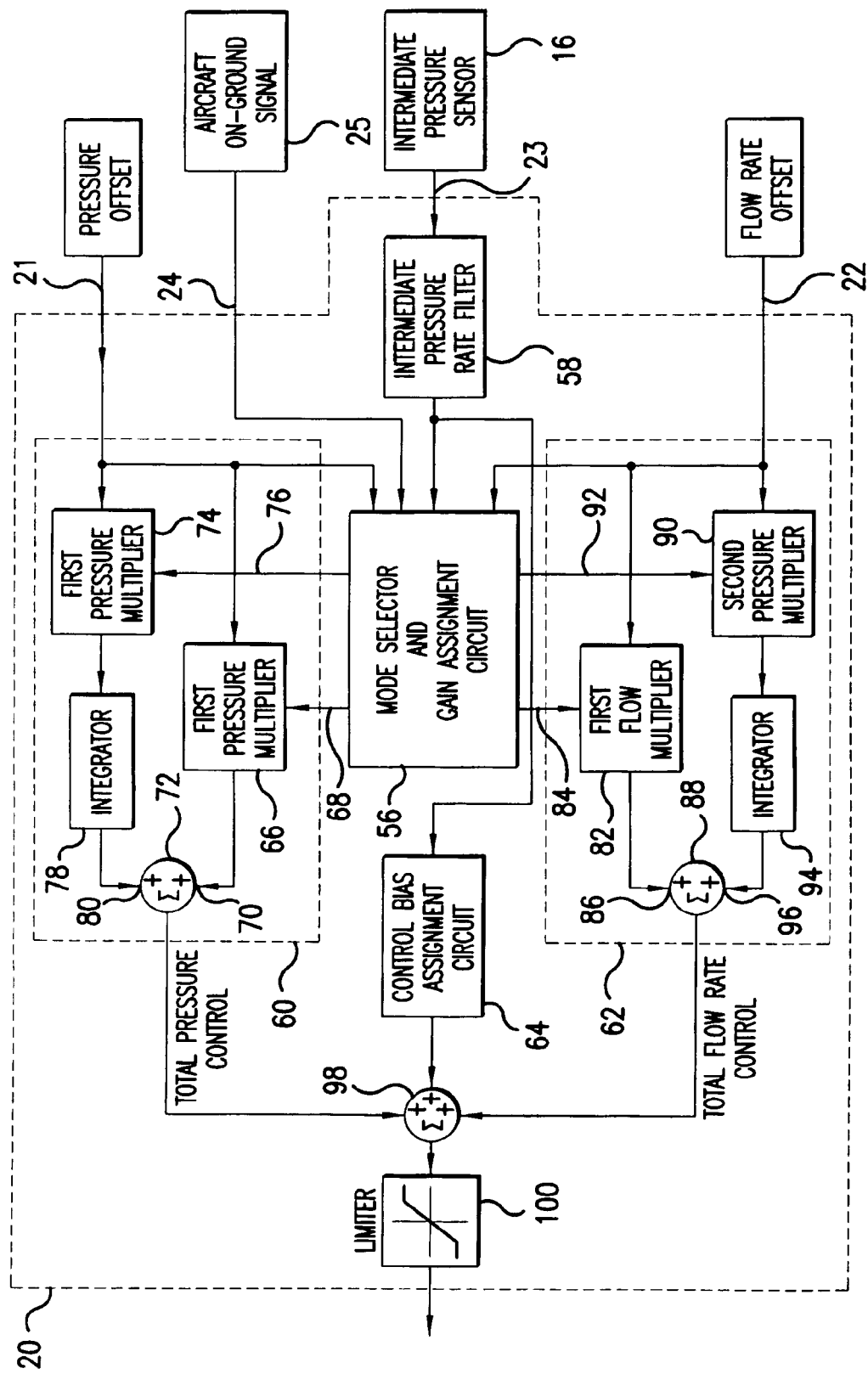
FIG. 2 schematically illustrates one of the controllers of FIG. 1.

Controller 20 is schematically illustrated in greater detail in FIG. 2. Controller 20 includes a mode selector and gain assignment circuit 56 which receives as input the pressure offset signal from controller input 21, the flow offset signal from flow offset input 22, the intermediate pressure signal from input 23 (having been filtered by intermediate pressure rate filter 58) and the aircraft on ground signal from input 24 and uses these values to set an operating mode for controller 20 as described hereinafter. Controller 20 further includes a pressure control loop 60 and a flow control loop 62 and a control bias assignment circuit 64.

Pressure control loop 56 receives as input the pressure offset signal from controller pressure offset input 21. This signal is received at a first pressure multiplier circuit 66 which multiplies the pressure offset signal by a first pressure gain provided by mode selector and gain assignment circuit 56 on first line 68. The output of first pressure multiplier circuit 66 is received at input 70 of pressure control summing circuit 72. The pressure offset signal received at pressure offset input 21 is also received at second pressure multiplier circuit 74 which multiplies the pressure offset signal by a second pressure gain provided by mode selector and gain assignment circuit 56 on second line 76. The output of second pressure multiplier circuit 74 is received at integrator 78, integrated, and received at second input 80 of pressure control summing circuit 72.

Flow control loop 58 receives as input the flow offset signal from controller flow offset input 22. This signal is received at a first flow multiplier circuit 82 which multiplies the flow offset signal by a first flow gain provided by mode selector and gain assignment circuit 56 on third line 84. The output of first flow multiplier circuit 82 is received at input 86 of flow rate control summing circuit 88. The flow offset signal received at flow offset input 22 is also received at second flow multiplier circuit 90 which multiplies the flow offset signal by a second flow gain provided by mode selector and gain assignment circuit 56 on fourth line 92. The output of second flow multiplier circuit 90 is received at integrator 94, integrated, and received at second input 96 of flow rate control summing circuit 88.

Controller 20 further includes a control summing circuit 98 that receives as input the output of pressure control summing circuit 72, flow rate control summing circuit 88 and control bias assignment circuit 64. In control summing circuit 98, the outputs of pressure summing circuit 72 and flow summing circuit 88 are added to a quantity called a control bias, which is a constant under most operating conditions. The control bias can change, however, when dips and surges in intermediate pressure rate (the rate of pressure change at one of intermediate pressure sensors 15) occur, such as during takeoff and transition to and from fixed altitude flight (cruising). Under these conditions, the control bias is changed to instantaneously reset the control command to designated levels that reduce the effect of the pressure transients caused by the aforementioned changes in operating conditions. The output of control summing circuit 98 is passed through a limiter 100, and the output of limiter 100 is output as signal 28 at controller output 26 and used to control the position of pressure regulating valve 16.

When pressure offset and flow rate offset are controlled using a single valve, the regulated pressure and flow rate variables will in general not completely converge to zero. One or both the regulated variables will likely end up with some residual offset, and most often it will be the flow offset that is noticeable and/or significant. Under certain operating conditions it may not be possible to achieve pressure regulation, and if the flow rate regulation function did not exist the pressure regulating valve 18 would be driven to its fully open condition. However, under these same operating conditions where pressure regulation is not possible, the pressure regulating valve 18 can still be used for a flow rate regulating function.

The mode selector and gain assignment circuit 56 uses several criteria to select a given set of values for the gain supplied on first line 68 to first pressure multiplier circuit 66, the gain supplied on line 76 to second pressure multiplier circuit 74, the gain supplied on third line 84 to first flow multiplier circuit 82 and on fourth line 94 to second flow multiplier circuit 90. There are four sets of control gains, or weights, each associated with one of four operating modes, referred to herein as Modes 1, 2, 3 and 4 and discussed individually below.

In mode 1, controller 20 attempts to achieve rapid convergence of both pressure and flow rate to designated setpoints or reference values. This is done by having the mode selector and gain assignment circuit 56 set the gains sent to first and second pressure multiplier circuits 66, 74 and to first and second flow multiplier circuits 82, 90 to their highest values.

Controller 20 shifts into Mode 2 when two conditions exist concurrently. The first condition is that the pressure offset is within a pressure regulation dead-band of, for example, +/−1.0 psi. This indicates that satisfactory pressure regulation has been achieved. The second condition is that the magnitude of the intermediate-pressure rate is less than some value such as about 0.01 psi/sec on ground or 0.11 psi/sec in air. This indicates that pressure conditions at the bleed path inlet 12 are steady and not about to change. In Mode 2, the gain sent to second pressure multiplier circuit 74 is scaled or set to zero; this reduces or eliminates the slow limit cycling that would likely plague a continued attempt to control pressure with a pressure control valve 18 that has poor hysteresis. In Mode 2, the gain sent to first flow rate multiplier circuit 82 and second flow rate multiplier circuit 90 are reduced substantially from their nominal values (using a scaling factor of, for example, 0.01). This reduction of the flow rate gains will slow the convergence of the flow offset 22 to zero and avoid triggering or sustaining high frequency small-amplitude limit-cycles in the pressure control valve 16 which could result from the inherently higher flow-dynamics loop gain.

The controller 20 enters Mode 3 when pressure regulation has been achieved or it is determined that pressure regulation cannot be achieved at a time when the flow rate offset is still large. In Mode 3, the gain used by first flow rate multiplier circuit 82 and by second flow rate multiplier circuit 90 are both set to their maximum values in order to achieve a rapid convergence of the flow rate offset 22 to zero. Meanwhile gains sent to first pressure multiplier circuit 66 and second pressure multiplier circuit 74 are reduced substantially from their full/nominal values (by a scaling factor of, for example, 0.01). In the case where pressure regulation has already been achieved, this permits the pressure proportional control, via first pressure multiplier circuit 66, to continue correcting for small drifts in pressure from the pressure setpoint.

In Mode 4, either pressure regulation has been achieved or it has been determined that pressure regulation cannot be achieved while the flow rate offset is within a flow rate regulation dead-band of, for example, +/−15.0 lbs/min. This indicates that satisfactory flow rate regulation has been achieved. In this mode the gain sent to second flow rate multiplier circuit 90 is reduced substantially, by multiplying by a scaling factor of 0.01, for example. This reduction in flow rate integral gain slows the convergence of the flow rate offset 22 to zero, but substantially avoids triggering high-frequency, small amplitude limit cycling of the pressure control valve. In Mode 4, the gain used by first pressure multiplier circuit 66 and the by second pressure multiplier circuit 74 are both set to zero, thereby stopping pressure regulation.

Figure 3:
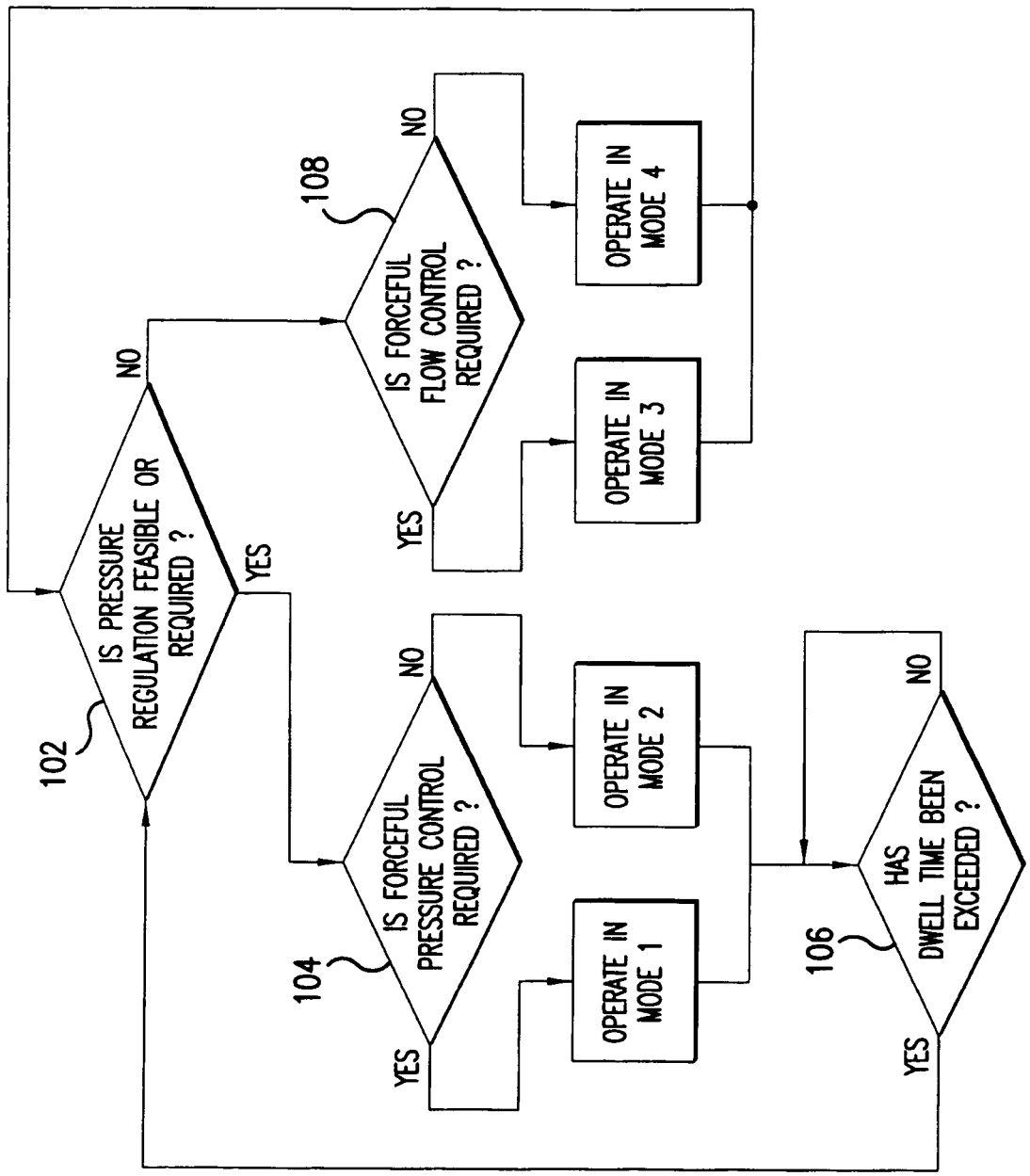
FIG. 3 is a flow chart illustrating a mode selection operation carried out by the system of FIG. 1.

FIG. 3 is a flow chart illustrating the selection of an appropriate mode by the mode selector and gain assignment circuit 56. A first determination is made at a step 102 as to whether pressure regulation is either feasible or required. Pressure regulation is deemed feasible if the pressure offset 21 is less than some predetermined pressure regulation band of, for example, ±10 psi when the aircraft is on the ground and ±4 psi when the aircraft is in the air. A pressure offset of this amount suggests that it may be possible to bring the regulated pressure closer to the pressure setpoint within a predetermined reasonable amount of time (for example, within 25 seconds).

Pressure regulation is deemed essential during take off, which is indicated by the intermediate pressure rate output by intermediate pressure rate filter 58 exceeding some predetermined value, such as 3 psi/sec while the on-ground sensor 25 indicates that the aircraft is still touching the ground. During takeoff, the regulated pressure sensed by pressure sensor 18 will initially start well below the pressure setpoint, and the pressure offset will fall outside the predetermined regulation band. As the engine thrust builds up, the pressure sensed at sensor 18 will very rapidly approach the pressure setpoint and reduce the offset to a value within the predetermined regulation band. That in itself would initiate pressure regulation but would lead to large pressure transients; such transients are substantially reduced by initiating pressure regulation earlier when the intermediate pressure rate exceeds 3 psi/sec.

If pressure regulation is either feasible or necessary a determination is made at step 104 as to whether forceful pressure control is required. Forceful pressure control is required when either a) the magnitude of the pressure offset is greater than some predetermined pressure deadband width (of, for example, +/−1 psi) which indicates that the pressure offset is still too large or b) the magnitude of the intermediate pressure rate is greater than a predetermined intermediate pressure rate quiescent band-width such as, for example, 0.01 psi/sec on the ground and 0.11 psi/sec in flight. These values indicate the onset of a pressure change that may require forceful pressure regulation to maintain a suitably small pressure offset. If forceful pressure regulation is needed, mode selector and gain assignment circuit 56 causes controller 20 to operate in Mode 1.

Once the controller 20 begins to operate in either Mode 1 or Mode 2, it is constrained to continue to operate in one of these modes for a minimum dwell time, such as, for example, 25 seconds. This helps ensure that for takeoff and other pressure changes, where the path pressure offset may rapidly cross the pressure regulation band, the pressure control loop is given sufficient time to attempt to force and maintain the pressure offset into the regulation band. A determination is made as to whether the minimum dwell time has been exceeded at step 106. After the minimum dwell time, the process returns to step 102. If at that time the pressure control loop has succeeded in forcing the pressure into the regulation band, then pressure regulation will be deemed feasible and the system can continue to operate in Mode 1 or Mode 2.

If, at step 102, it is determined that pressure regulation is neither feasible nor required, the controller 20 attempts to regulate flow rather than pressure, and a determination is made at step 108 as to whether forceful flow control is needed. If forceful flow control is needed, Mode 3 is selected. High values for gain are sent to first flow multiplier circuit 82 and second flow rate multiplier circuit 90 to drive the flow rate offset rapidly toward zero.

Once the flow offset enters a flow dull band of, for example, ±15 pounds per minute, forceful flow rate regulation is no longer required, and operation of the system shifts into Mode 4. Operating in this mode helps reduce limit cycling as described above. Operation is not required to be maintained in Mode 3 and Mode 4 for any minimum dwell time; therefore, once pressure regulation is again determined to be feasible or required at step 102, operation shifts to either Mode 1 or Mode 2.

Pressure surges or dips, during takeoff and transitions to and from fixed altitude flight, may induce and/or magnify existing flow rate imbalances. The effects of such transitions are minimized by rapid and brief control resets that are initiated when a path's intermediate pressure rate; as determined by intermediate pressure rate filter 58, exceeds or drops below designated values. When the rate exceeds or drops below required values, output 26 of controller 20 is quickly adjusted to a predetermined command value; this command value rapidly changes the opening of the pressure regulating valve 18. This is accomplished by the control bias assignment circuit 64, which changes the control bias signal input to control summing circuit 98. During such a reset to the control bias, the gain sent to second pressure multiplier circuit 74 is scaled by a factor of, for example, 0.3, and then increased over about 10 seconds to its full value. This permits the commanded control signal at controller output 26 to persist long enough to effectively reduce the repercussions of the pressure surge or dip on any existing flow imbalance. When pressure surge/dip adjustments occur during takeoff, the controls are in Mode 1. Other pressure surge/dip adjustments will push the controller into Mode 1 when pressure offset is within the pressure regulation band or into Mode 3 when it is not within the pressure regulation band.

Figure 4:
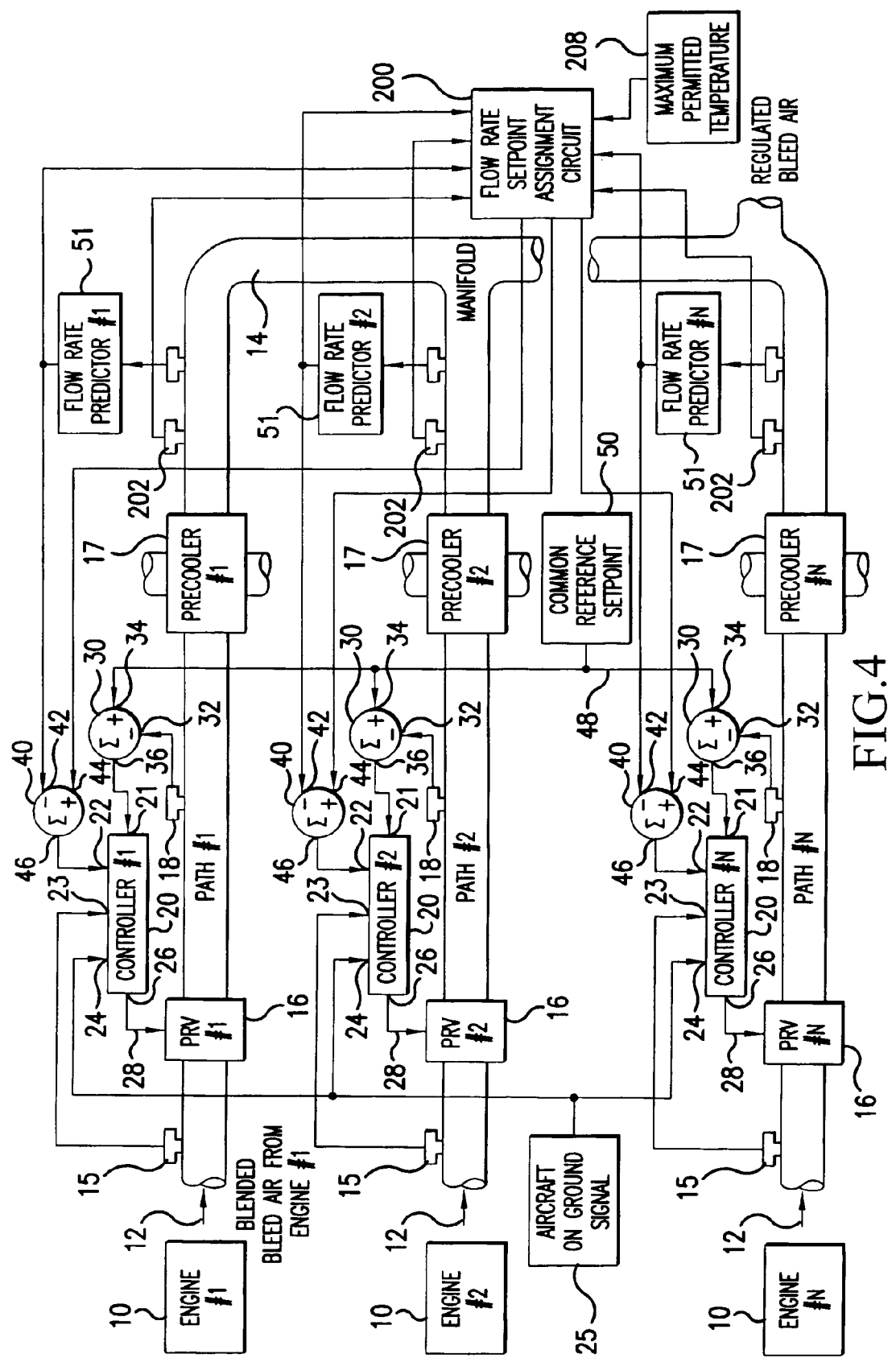
FIG. 4 schematically illustrates a bleed air balancing system, including a plurality of controllers, according to another embodiment of the present invention.

A second embodiment of the invention is illustrated in FIG. 4 wherein elements common to the first embodiment are identified using common reference numerals. In this embodiment, flow rate averaging circuit 52 is replaced with a flow rate setpoint assignment circuit 200, illustrated in detail in FIG. 5, and a plurality of temperature sensors 202 located downstream of precoolers 17 which provide temperature information to flow rate setpoint assignment circuit 200. Occasionally, due to engine or cooling system malfunction, heat exchangers that are often part of a bleed path may overheat and get damaged. In such cases it would be desirable to re-distribute the bleed air flow unequally among the various paths. Reducing the flow rate in a flow path where overheating is occurring allows that flow path to cool. At the same time, additional bleed air should be provided to the flow path or paths that are not overheating to maintain a substantially constant flow in manifold 14. The overall effect is that flow rates in the overheated paths are each reduced by whatever amount may be necessary to maintain their temperatures at the maximum permitted value while the flow rates are balanced among the remaining, cooler, paths.

Figure 5:
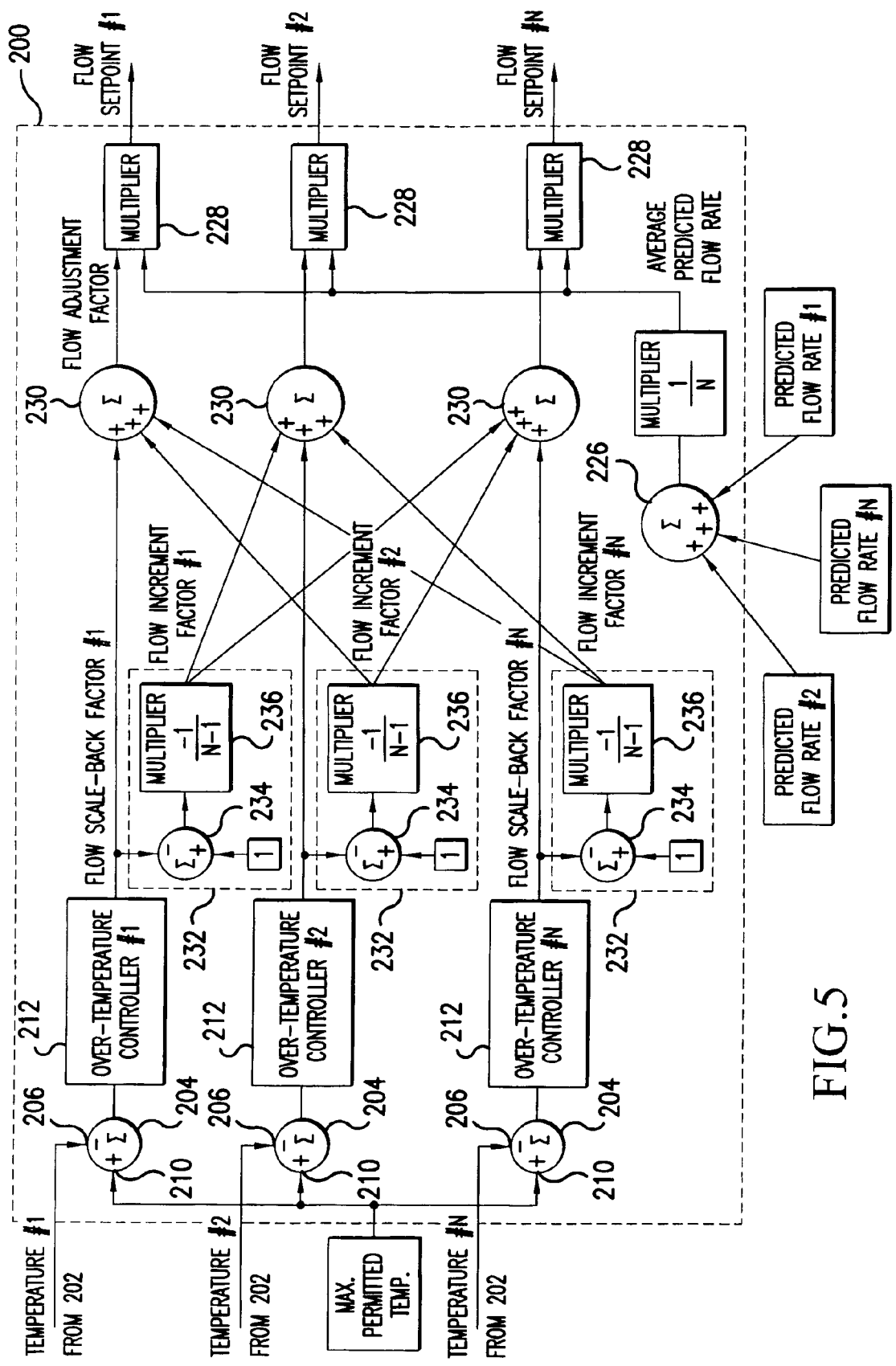
FIG. 5 schematically illustrates the flow rate setpoint circuit of FIG. 4.

Referring now to FIG. 5, flow rate setpoint assignment circuit 200 includes a plurality of temperature comparators 204 each having a first input 206 operatively connected to one of the outputs of each of temperature sensors 202. A circuit 208 for storing a maximum permitted temperature is connected to the second input 210 of comparators 204. The outputs of comparators 204 is input to a plurality of over-temperature controllers 212, illustrated in detail in FIG. 6.

Flow rate setpoint assignment circuit 200 also receives predicted flow rate inputs from each of flow rate predictors 51, sums them in a predicted flow rate summer 226, and multiplies the output of predicted flow rate summer 226 by the inverse of the number of flow paths 12 to provide a first input to a flow setpoint multiplier 228 for each of the flow paths. The second input to flow setpoint multipliers 228 is a modified signal from over-temperature controller 212 which causes the flow rate in an overheated flow path to be reduced while increasing the flow rates in the non-overheated flow paths to compensate.

Figure 6:
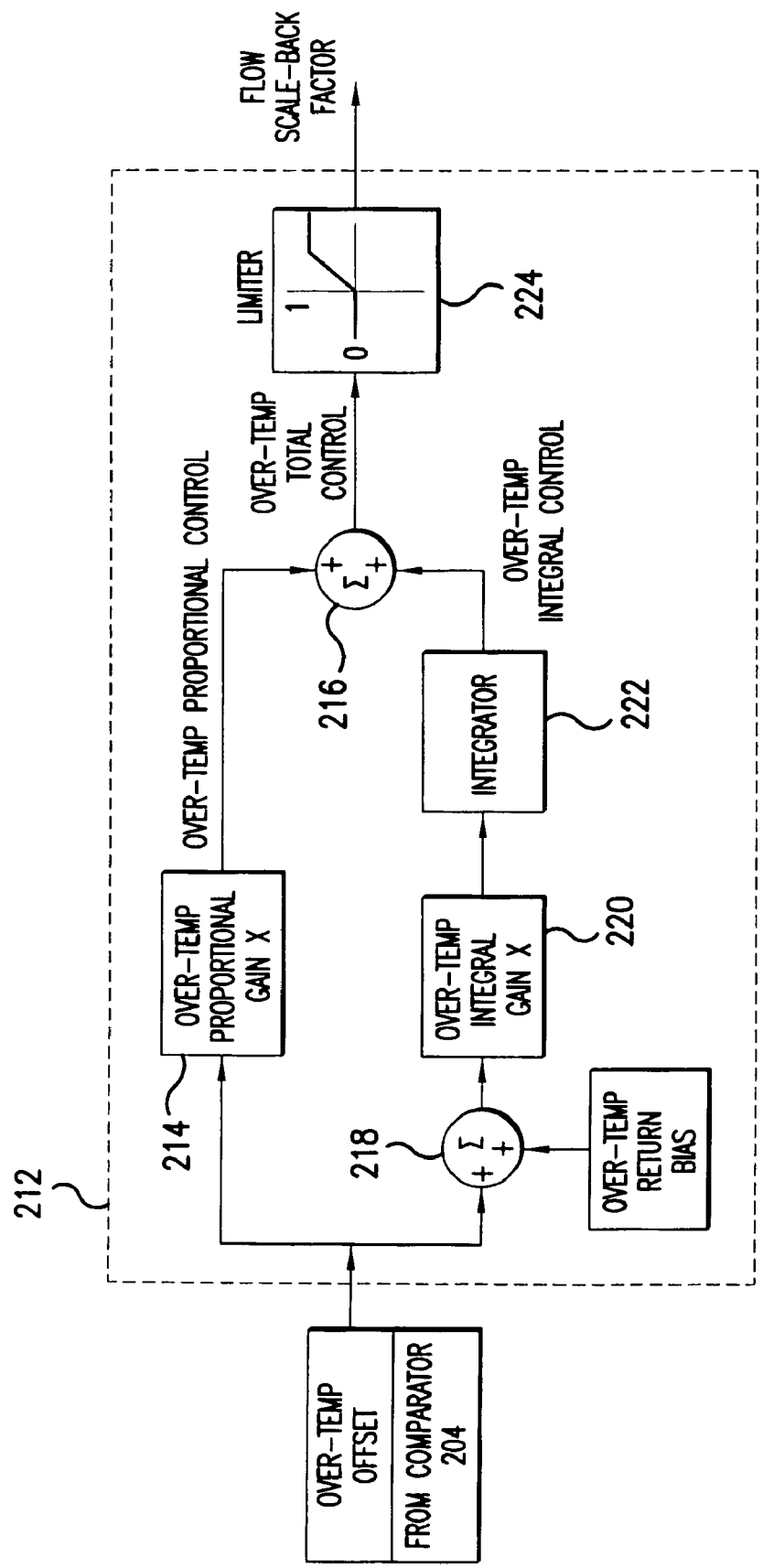
FIG. 6 schematically illustrates the over-temperature controller of FIG. 5.

As seen in FIG. 6, over-temperature controller 212 receives a signal representing the over-temperature offset output from comparator 204. This signal is sent to an over temperature proportional gain circuit 214 where it is multiplied by a first gain. The output of over temperature proportional gain circuit 214 is sent to the first input of an over-temperature summing circuit 216. The offset signal from comparator 204 is also sent to an over-temperature bias summer 218 which adds an over-temperature bias to the offset. The output of over-temperature bias summer 218 is multiplied by an over-temperature integral gain in over-temperature integral gain circuit 220. The output of over-temperature integral gain circuit 220 is integrated by integrator 222, and the output of integrator 222 is sent to a second input of over-temperature summing circuit 216. The output of over-temperature summing circuit 216 is sent to limiter 224 and output from the over-temperature controller 212.

Referring again to FIG. 5, a flow adjustment summer 230 is connected between over-temperature controller 212 and flow setpoint multiplier 228 which sends a flow adjustment factor by which multiplier 228 adjusts its output signal. A flow increment factor circuit 232 is connected at an output of over-temperature controller 212. Each flow increment factor circuit 232 includes a flow increment summer 234 that compares the output of over-temperature controller 212 to unity and outputs the result to a circuit 236 that multiplies this output by $-1/(N-1)$, where N is the number of flow paths.

Each flow adjustment summer 230 receives as a first input the output of the over-temperature controller 212, sometimes referred to as a flow scale back factor, from its respective flow path and second to Nth inputs. The second to Nth inputs are the outputs of the flow incrementing circuits 232 of associated with each of the other N-1 flow paths.

Figure 7:
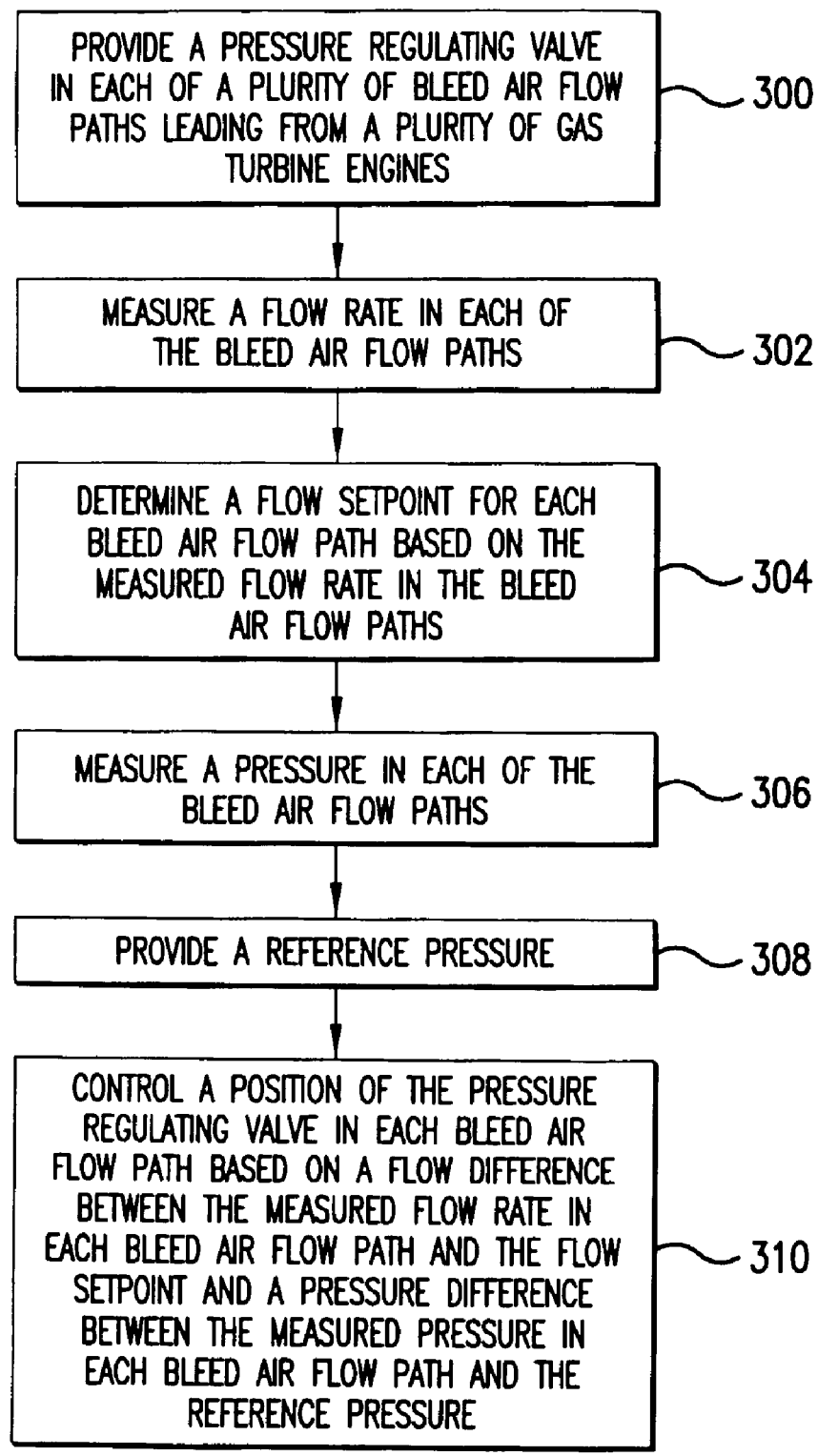
FIG. 7 is a flow chart illustrating a first bleed flow balancing method according to an embodiment of the present invention.

With reference to FIG. 7, a method according to an embodiment of the present invention involves providing a pressure regulating valve in each of a plurality of bleed air flow paths leading from a plurality of gas turbine engines at a step 300, measuring a flow rate in each of the flow paths at a step 302, determining a flow setpoint for each bleed air flow path based on the measured flow rate in the bleed air flow path at a step 304, measuring a pressure in each of the bleed air flow paths at a step 306, providing a reference pressure at a step 308 and controlling a position of the pressure regulating valve in each bleed air flow path based on a flow difference between the measured flow rate in each bleed air flow path and the flow setpoint and a pressure difference between the measured pressure in each bleed air flow path and the reference pressure at a step 310.

Figure 8:
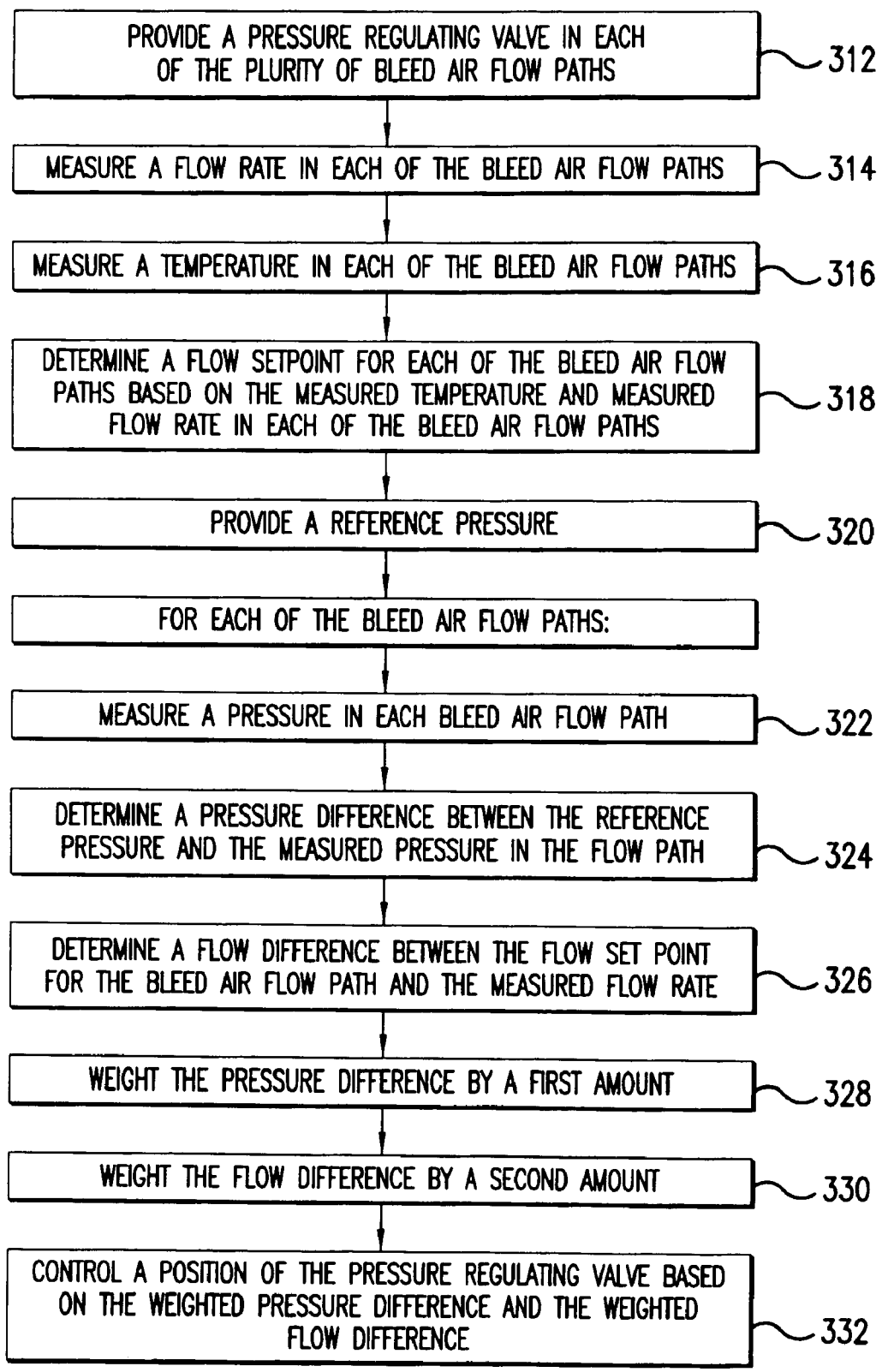
FIG. 8 is a flow chart illustrating a second bleed flow balancing method according to an embodiment of the present invention.

With reference to FIG. 8, a second method according to an embodiment of the present invention involves providing a pressure regulating valve in each of a plurality of bleed air flow paths at a step 312, measuring a flow rate in each of the bleed air flow paths at a step 314, measuring a temperature in each of the bleed air flow paths at a step 316, determining a flow setpoint for each of the bleed air flow paths based on the measured temperature and measured flow rate in each of the bleed air flow paths at a step 318, providing a reference pressure at a step 320, and, for each of the bleed air flow paths, measuring a pressure in each bleed air flow path at a step 322, determining a pressure difference between the reference pressure and the measured pressure in the flow path at a step 324, determining a flow difference between the flow set point for the bleed air flow path and the measure flow rate at a step 326, weighting the pressure difference by a first amount at a step 328, weighting the flow difference by a second amount at a step 330 and controlling a position of the pressure regulating valve based on the weighted pressure difference and the weighted flow difference at a step 332.

The present invention has been described herein in terms of preferred embodiments. However, numerous changes and additions to this embodiment will become apparent to those skilled in the relevant arts upon a reading of the foregoing description. It is intended that all such modifications and additions form a part of the subject invention to the extent they fall within the scope of the several claims appended hereto.

I claim:

1. A method of balancing bleed air flows in a plurality of bleed air flow paths associated with a plurality of gas turbine engines comprising:
   providing a pressure regulating valve in each of the plurality of bleed air flow paths;
   measuring a flow rate in each of the bleed air flow paths;
   determining a common flow setpoint for each bleed air flow path of the plurality based on the measured flow rate in each of the bleed air flow paths;
   measuring a pressure in each of the bleed air flow paths;
   providing a reference pressure; and
   controlling a position of the pressure regulating valve in each bleed air flow path based on a flow difference between the measured flow rate in said each bleed air flow path and said common flow setpoint and a pressure difference between the measured pressure in said each bleed air flow path and the reference pressure.

2. The method of claim 1 wherein determining said common flow setpoint comprises the step of determining an average of a predicted flow rate in each of the plurality of bleed air flow paths.

3. The method of claim 1 wherein determining said common flow setpoint comprises measuring a temperature in each of the bleed air flow paths and determining said common flow setpoint for each of the bleed air flow paths based on the measured temperature in said each of the bleed air flow paths.

4. The method of claim 1 wherein controlling a position of the pressure regulating valve comprises for each of the plurality of flow paths:
   providing a controller for the pressure regulating valve;
   providing the flow difference for the each bleed air flow path as a first input to the controller;
   providing the pressure difference for the each bleed air flow path as a second input to the controller; and
   providing a control signal output from the controller to the pressure regulating valve based on the first and second inputs.

5. The method of claim 4 wherein providing a control signal output comprises adding the pressure difference and the flow difference to a control bias.

6. The method of claim 1 wherein controlling a position of the pressure regulating valve comprises:
   determining a flow difference gain;
   determining a pressure difference gain;
   multiplying the pressure difference by the pressure difference gain; and
   multiplying the flow difference by the flow difference gain.

7. The method of claim 6 including varying the flow difference gain and the pressure difference gain based on measured operating conditions of the plurality of engines.

8. The method of claim 6 wherein the flow difference gain comprises a proportional gain and an integral gain and the pressure difference gain comprises a proportional gain and an integral gain, and including varying the proportional gains and integral gains based on measured operating conditions of the engines.

9. The method of claim 6 including setting the flow difference gain to a first flow difference gain value and the pressure difference gain to a first pressure difference gain value and further including reducing the first flow difference gain value when the pressure difference falls below a predetermined value.

10. The method of claim 8 including reducing the integral gain of the flow difference gain to 0 when the pressure difference falls below a predetermined value.

11. The method of claim 8 including reducing the proportional and integral gains of the flow difference gain and reducing the integral gain of the pressure difference gain to 0 when the pressure difference falls below a predetermined value.

12. The method of claim 1 wherein controlling a position of the pressure regulating valve in each channel further comprises independently controlling a position of the pressure regulating valve in each channel.

13. A bleed air balancing system comprising:
   a plurality of bleed air flow paths each carrying bleed air from one of a plurality of gas turbine engines and including a flow rate sensor;
   a circuit outputting at least one common flow rate setpoint based on flow rates measured by each of the flow rate sensors;
   wherein each of the plurality of bleed air flow paths includes:
   a pressure regulating valve;
   a pressure sensor; and
   a controller for controlling the position of the pressure regulating valve, said controller including an output connected to said pressure regulating valve, a pressure control loop generating a pressure correction signal, and a flow control loop generating a flow correction signal;
   wherein said controller outputs a control signal on said output based on said pressure correction signal and said flow correction signal.

14. The system of claim 13 wherein said at least one common flow rate setpoint comprises an average of a predicted flow rate in each of the plurality of bleed air flow paths.

15. The system of claim 13 wherein said pressure control loop has a variable pressure gain and said flow control loop has a variable flow gain.

16. The system of claim 15 wherein said variable pressure gain comprises a variable integral gain and a variable proportional gain and said variable flow gain has a variable integral gain and a variable proportional gain.

17. The system of claim 15 wherein said variable pressure gain has a first value under a first set of operating conditions and a second value under a second set of operating conditions.

18. The system of claim 16 wherein said variable pressure integral gain takes on a first value and said variable pressure proportional gain takes on a second value under a first set of operating conditions and wherein said variable pressure integral gain takes on a third value and said variable pressure proportional gain takes on a fourth value under a second set of operating conditions.

19. The system of claim 13 including:
   a temperature sensor in each of said plurality of bleed air flow paths; and
   a circuit connected to each of said temperature sensors for adjusting said at least one common flow rate setpoint based on measured temperatures in said bleed air flow paths.

20. A method of balancing bleed air flows in a plurality of bleed air flow paths associated with a plurality of gas turbine engines comprising the steps of:

provuding a pressure regulating valve in each of the plurality of bleed air flow paths;
measuring a flow rate in each of the bleed air flow paths;
measuring a temperature in each of the bleed air flow paths;
determining a common flow setpoint for each of the bleed air flow paths of the plurality based on the measured temperature and measured flow rate in each of the bleed air flow paths;
providing a reference pressure;
for each of the bleed air flow paths:
measuring a pressure in said each bleed air flow path;
determining a pressure difference between the reference pressure and the measured pressure in the flow path;
determining a flow difference between said common flow set point for said bleed air flow path and the measured flow rate;
weighting the pressure difference by a first amount;
weighting the flow difference by a second amount; and
controlling a position of the pressure regulating valve based on said weighted pressure difference and said weighted flow difference.

\* \* \* \* \*